Dec. 20, 1932.  W. H. WOOD  1,891,792
GLASS WORKING APPARATUS
Filed Oct. 19, 1927  2 Sheets-Sheet 1

William H. Wood
Inventor
By Smith and Freeman
Attorneys

Dec. 20, 1932.  W. H. WOOD  1,891,792
GLASS WORKING APPARATUS
Filed Oct. 19, 1927  2 Sheets-Sheet 2
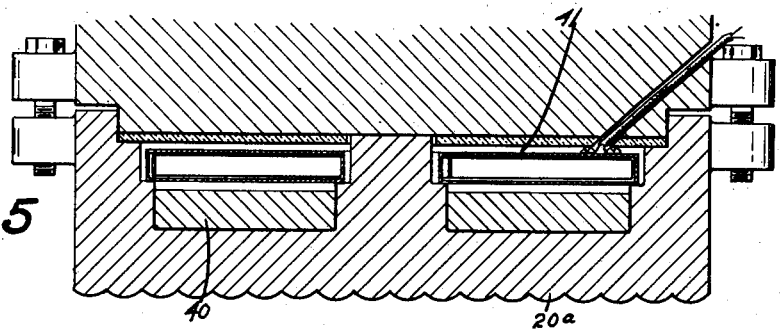
Fig. 5
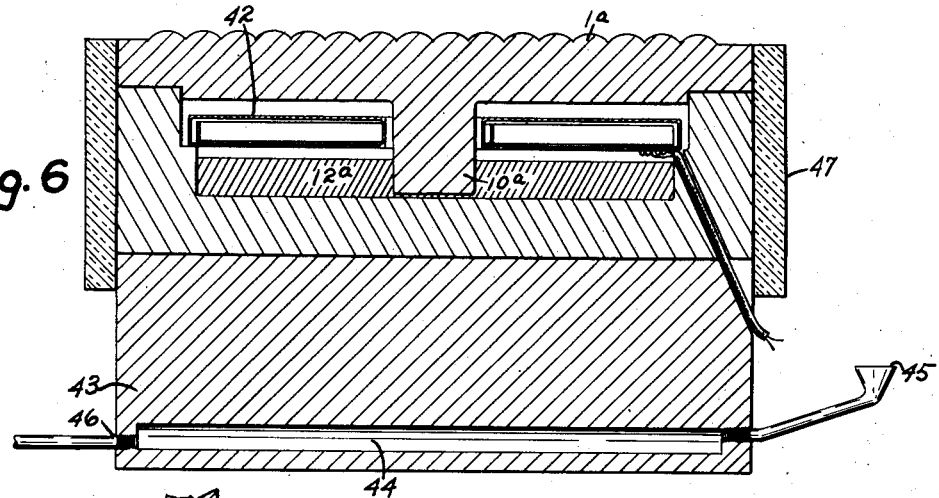
Fig. 6
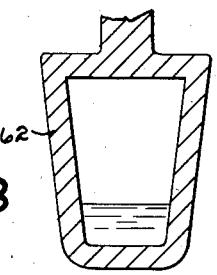
Fig. 8
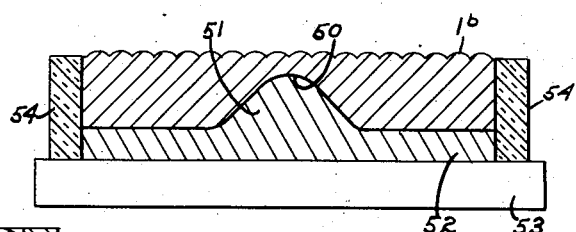
Fig. 7
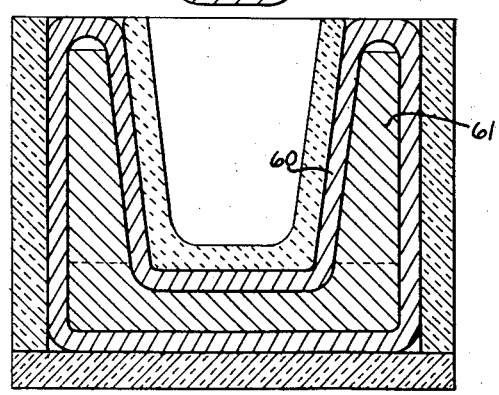
William H. Wood
Inventor
By Smith and Freeman
Attorneys Patented Dec. 20, 1932

1,891,792

UNITED STATES PATENT OFFICE

WILLIAM H. WOOD, OF SOUTH EUCLID, OHIO

GLASS WORKING APPARATUS

Application filed October 19, 1927. Serial No. 227,112.

This invention relates to glass working and has particular reference to the pressing of articles such as headlight lenses, battery jars and the like, although some features of the invention may be susceptible of a wider use. In the following description I have taken the manufacture of headlight lenses partly as an end and partly as an illustration.

Devices of this nature are made by pressing molten glass in metal molds. The particular practice following varies in different places but is characterized in general by requiring an excessive amount of experience and skill on the part of the performers which, in turn, not only entails an unduly large labor cost but also an unduly large percentage of defective product. For example, the colder the mold is, the hotter must be the glass, and the quicker it must be removed, though not until it has become solidified. The hotter the mold is the cooler the bulk of the glass can be and the longer it can be left in the mold. The amount of the glass introduced into the mold and also its temperature have heretofore been gauged by the eye only, and the variations in temperature between the glass and mold and between different parts of the mold have caused corrosion and erosion and warping and cracking of the mold; also attempts to produce articles with molds at an improper temperature or with molds which have unequal temperatures at different parts result in a product having large internal strains which produce eventual breakage.

Among the objects of my invention are the provision of an improved molding equipment which shall reduce the temperature differences and variations heretofore encountered, render the temperature conditions and rate of heat-loss substantially uniform, and thereby decrease the importance of the human element and increase the percentage of perfect output. Another object of my invention is the provision of equipment and procedure which shall facilitate the orderly and timed operation of the apparatus as desirable for large scale production and indispensible to machine performance.

Figure 1:
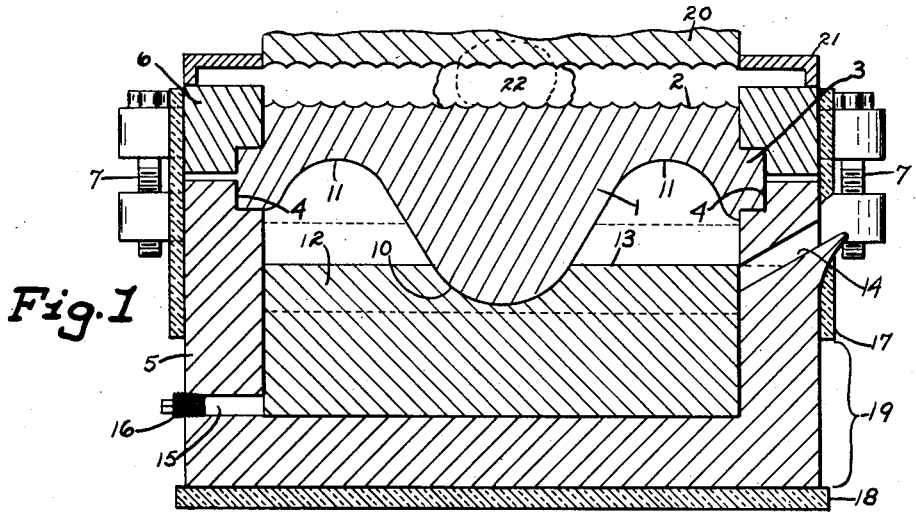
Figure 2:
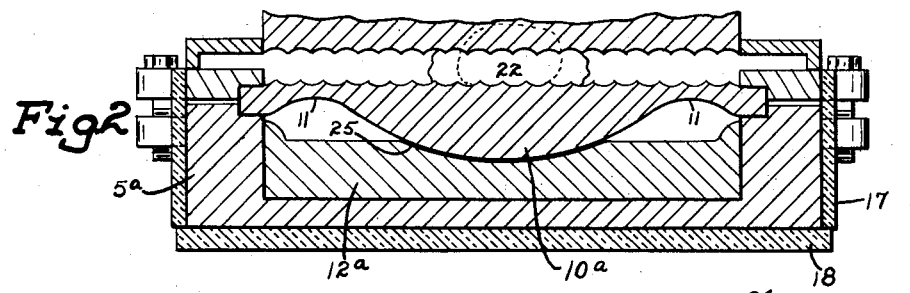
Figure 3:
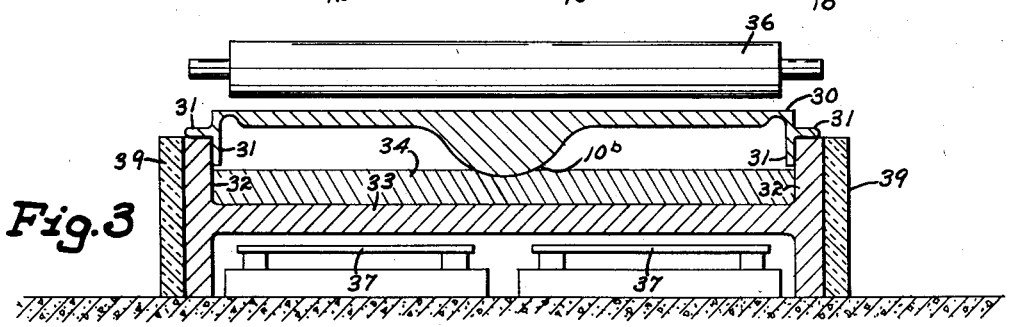

In the drawings accompanying and forming a part of this application I have shown certain specimen dies embodying my inventive ideas. Fig. 1 is a vertical sectional view through a die embodying certain of my improvements; Fig. 2 illustrates a modification and extension of the ideas shown in Fig. 1; Fig. 3 is a cross sectional view and Fig. 4 a top plan view (but to decreased scale) of a glass rolling table embodying certain of my improvements; Fig. 5 illustrates a top die and Fig. 6 a bottom die illustrating further features of my invention; Figs. 7 and 8 are vertical sectional views through other shapes of glass pressing dies containing my improvements.

In Fig. 1 I have shown a circular metal die member 1 having its upper surface suitably patterned as at 2 for the purpose in view, and having a lateral supporting projection 3 at its margin engaged in a suitable recess 4 of a hollow supporting member 5. A suitable clamping ring 6 and bolts 7 secure said die member in said supporting member. The bottom of said die-member is formed with a circular boss 10 depending into the hollow interior of the member 5 and surrounded by an annular groove 11 which extends fairly near to the working surface. Inside the member 5 I locate a mass 12 of a metal of lower melting point and higher heat diffusing ability than the member 1. Preferably the surface of this metal stands at such a height as to submerge a part of the projection 1 as indicated at 13, but a filling opening 14 and a drainage opening 15 closed by a plug 16 permit elevation or depression of level as may be desired. As a result of this construction it will be seen that the die assemblage as a whole exhibits a recess alongside the die-face and the added metal is so located in this recess as to absorb heat from the overheated portions and transmit the same to the underheated portions.

The particular die shown in Fig. 1 is for a vehicle lens and is accompanied by a companion die member 20 and a rim ring 21. In the operation of such a die, a quantity of molten glass indicated at 22 is placed on the top of the member 1, after which the companion member 20 is pressed thereon so as to displace the plastic glass over the entire surface of the dies and cause the same to conform to the profile thereof. As soon as the glass has become sufficiently solidified the member 20 is raised, the ring 21 removed, and the hot glass article transferred to a suitable annealing chamber. For the most successful use of the apparatus it is desirable that the temperature of the dies be maintained uniform over the entire working surface, and further that this temperature be fairly elevated so as not unduly to chill the molten glass. The repeated application of hot glass to the center of the die member 1 tends to heat this central portion unduly with the production of one or more of the following difficulties: (1) local erosion of the die; (2) breakage of the die due to unequal expansion; (3) breakage or defect of the product due to uneven temperatures. It is for this reason that I provide the die with a path of escape for this excessive heat opposite this point of highest temperature. In the form of the invention shown in Fig. 1 this consists of the depending metal boss 10 and the mass of metal 12 in contact therewith adapted to abstract such heat more or less rapidly depending upon the nature of the metal employed and the height of the same. The rapidity of heat absorption is enhanced by raising the level of this metal and employing a metal of highest conductivity. Uniformity of working temperature is enhanced by employing a metal which changes its state at approximately the working temperature desired to be maintained. This change of state can consist of vaporizing as in the case of mercury or in melting as in the case of lead, zinc, aluminum, antimony, and their alloys such as type metal and the different alloys employed in aluminum casting.

The latent heat so delays the melting and solidification as to tend to keep all parts of the mold at the same uniform temperature. It is desirable to surround the die with a band 17 of heat-insulating material which shall diminish the tendency for a temperature gradient to exist between the center and edge. It is also generally best to rest the die on a sheet of heat insulating material 18 lest the escape of heat be so rapid as to preclude maintaining a proper working temperature. I preferably leave a gap 19 between the band 17 and sheet 18 to permit escape of heat, this being sufficiently removed from the working face to prevent any localized effect. The edges of the die member are heated from the walls 5. Owing to the groove 11 the dissipation of heat laterally along the die face is reduced. If used at all it is so located as to assist in maintaining the die-face at a uniform temperature throughout. In case one wishes to maintain a higher temperature, and a more rapid rate of heat dissipation than is possible with the device shown in Fig. 1, the modified device shown in Fig. 2 can be employed wherein the vertical dimension of the projection $10^a$ is decreased and also the vertical dimension of the supporting member $5^a$, while the mass $12^a$ is composed of a metal of increased conductivity, such as copper. This metal will not be molten during the use of the apparatus but owing to its high conductivity will transmit and distribute heat more rapidly than a molten metal would do. Preferably a comparatively thin film 25 of more fusible metal is employed between the projection $10^a$ and the copper mass to facilitate heat transfer, and this can further be facilitated in most cases by coating the surface of the projection $10^a$ with an electro-deposited layer of a metal which resists atmospheric oxidation. Also in Fig. 2 I have shown the die assembly as surrounded by a heat insulating band 17 and resting on a heat insulating block 18 but with increase of working temperature less need for cooling exists.

Figure 4:
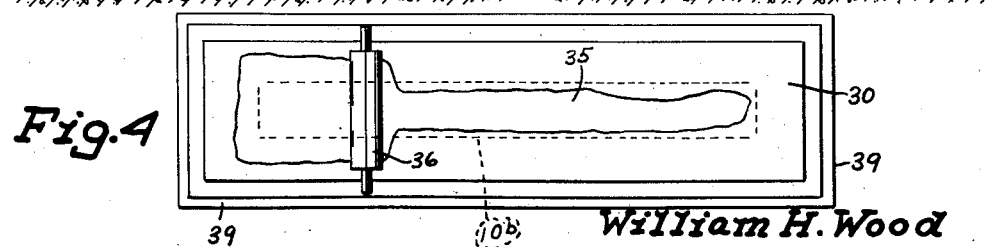

In Figs. 3 and 4 I have shown a modified shape of glass working apparatus, namely a rolling table for plate or ribbed glass. 30 denotes a rectangular sheet of metal, substantially flat on top but with a depending projection $10^b$ along its lower face. By means of marginal flanges 31—31 this member 30 is supported upon the walls 32 of a rectangular trough 33, filled to a suitable height with a metal mass 34 of suitable melting point in which the end of the projection $10^b$ is immersed. In use the molten glass is poured along the center of a table as illustrated at 35 in Fig. 4 and a suitable roller 36 passed over the same. The local heating due to this hot glass is dissipated by conduction into the metal mass 34, which metal mass further tends to keep the alloy at proper working temperature. This temperature is initiated at the beginning of the operation by means of suitable electrical heating devices 37 located beneath the trough 33. After the device has been in use for a time these become less necessary and can sometimes be discontinued. Insulating panels 39 are employed to prevent lateral loss of heat.

An electric heater can be if desired combined with devices of the type shown in Fig. 1. Thus in Fig. 5 the top member $20^a$ of the die is provided with an annular chamber 40 partly filled with a metal of suitable melting point, and partly occupied by an annular electric resistance element 41. Likewise in Fig. 6 I have shown a die member $1^a$ as having secured against its lower face an annular heating element 42, although I have still illustrated the central, integral, metallic projection $10^a$ projecting through that heating element and into engagement with a metal mass $12^a$, since in general the center of such a mold is more likely to suffer from over heating than from over-cooling. The lateral portion of the die assembly is preferably covered with a coating 47 of heat insulating material to facilitate the lateral transfer of heat from the center of the die face.

In Fig. 6 I have shown a further expedient for securing the proper temperature control, namely that the base of the die is formed opposite the working face with a stem 43 of considerable heat conductivity, in which stem at a distance from the die is formed a cooling chamber 44 provided with a suitable inlet 45 for water or the like cooling liquid and with a suitable outlet 46.

The principal use of the electric heating element is to bring the dies to working temperature at the start, which has oftentimes heretofore been done by pouring molten glass thereon, with consequent erosion of the die, strain upon the die metal, and loss of glass. Ordinarily when once started and working steadily the problem is rather one of cooling than of heating, for which purpose I provide a cooling device so far removed from the working surface as not to have any unequal or localized effect thereon.

Another form which my invention may take (although less adapted to large scale production) is shown in Fig. 7 wherein the die member 1$^b$, instead of being provided with a depending integral metal mass at the center of its lower face, is formed with a cavity 50 rising well towards the working surface, this cavity being filled with a mass 51 of solidified metal which makes close contact with the walls of said cavity and is continuous with other metal portions 52 which extend underneath the remainder of the die. This assemblage rests on a block 53 of suitable conductive and absorbing character, and is preferably also surrounded by a ring 54 of heat insulating material. A satisfactory substance for the metal mass 51 is copper which facilitates the distribution of the heat from the center of the mold to other parts thereof.

In Fig. 8 I have shown another form of my invention, adapted for use with a different type of glass mold, such as is employed in the making of battery jars, tumblers, etc., one of the elements being recessed and the other constituting a plunger which enters into said recess. In the use of such a mold the molten glass is ordinarily introduced into the recessed member after which the plunger is caused to distribute the glass and afford it the desired shape. As a result the bottom part of the recess becomes unduly heated and the remainder of the same unduly cooled, while a large difference in temperature also occurs between the end and base of the plunger, with the result that successful operation of the device is possible only through a very small temperature range, and oftentimes as much as 75% of the output is defective. To overcome these difficulties I provide each of the elements with a filling of a dissimilar metallic substance adapted to assist in the distribution of heat. To this end the die member 60 is formed hollow as illustrated at 61 and a quantity of metal of heat transporting nature introduced therein. This metal may be either one which conveys heat by conduction or convection. One very successful way is to make the same of copper, suitable provisions being made to secure good thermal contact. Another excellent way is to employ instead of copper a smaller amount of mercury with the result that as soon as the mercury reaches its boiling point the vapor thereof rises into the remaining portions of the cavity and condenses on the walls thereof until all are maintained at the same temperature. The plunger 62 is also made hollow and provided with a filling of copper, mercury, or other heat dissipating metal.

In all such apparatus the essential consideration is the maintenance of a uniform temperature throughout its different parts, despite any tendency towards inequalities produced by the operation of the apparatus, this equalization being effected by employing special heat conducting provisions built into the die members. As a result the apparatus can be used successfully throughout a larger range of glass temperatures, it can be employed with a larger range of glass mixtures, the proportion of acceptable output is increased, the human factor is diminished, and mechanical operation is advanced. I have chosen dissimilar structures as illustrative embodiments of my inventive idea to demonstrate that I do not limit myself to any narrow interpretation thereof since many changes are intended to be comprehended within my various claims which I request may be construed each independently of limitations contained in other claims.

Having thus described my invention what I claim is:

1. The process of equalizing temperature between different parts of a glass article-pressing device which consists in making the glass-contacting element hollow and supplying the cavity with a metal of lower melting point than the metal of the die-face.

2. The process of equalizing temperature between different parts of a glass article-pressing device which consists in making the glass-contacting element hollow and supplying the cavity with a metal which fuses substantially at the temperature desired to be maintained.

3. The process of equalizing temperature between different parts of a glass article-pressing device which consists in making the glass-contacting element hollow and placing therein a metal having a heat conducting and distributing ability superior to that of the metal die-face.

4. The process of equalizing temperature between different parts of a glass article pressing device which consists in forming a recess in the glass contacting element parallel to the glass contacting face thereof and providing a path of escape across said recess for excess heat from that part of the die-face which tends to acquire too high a temperature.

5. The process of equalizing temperature between different parts of a glass article pressing device which consists in forming a recess in the glass contacting element parallel to the glass contacting face thereof and placing therein a substance having a heat conducting and distributing ability superior to that of the metal die-face.

6. In glass article pressing machinery, a die member having a metal face formed to make contact with the molten glass, and a layer of metal of higher heat dissipating ability than the metal of the die face located inside said die member parallel to the die-face in stationary, heat conducting relation therewith to equalize temperatures throughout the same.

7. In glass article pressing machinery, a die member having a metal face formed to make contact with the molten glass, and a layer of metal of higher heat dissipating ability than the metal of the die-face supported in thermal contact with that part of the die member which tends to become unduly heated.

8. In glass article pressing machinery, a metal die member having a face adapted to make direct contact with the molten glass, a recess parallel to such glass-contacting face, and a metallic substance in said recess having a heat transferring ability superior to that of the metal die-face.

9. In glass article pressing machinery, a metal die member having a face adapted to make direct contact with the molten glass, a recess parallel to such glass-contacting face and a metallic substance in said recess having a melting point below that of the metal of the die-face.

10. In glass article pressing machinery, a metal die member having a face adapted to make direct contact with the molten glass, a recess parallel to such glass-contacting face, and a metallic substance in said recess which changes its physical state at a temperature substantially equal to the optimum working temperature.

11. In glass article pressing machinery, a metal die member, means for obstructing heat loss from the margins of said member, and for providing a path of heat loss vertically from the mid point of said die member.

12. In glass article pressing machinery, a metal die member having a working face and a recess parallel to said working face, means in said recess, including a metal of lower melting point than the die metal, for equalizing the temperature throughout different transverse portions of said die member, and means for insulating the marginal portions of said member against heat loss.

13. In glass disk pressing machinery, a metal die member having a working face and a recess parallel to said working face, means in said recess including a metal of higher heat dissipating capacity than the die metal, for equalizing the temperature throughout different tranverse portions of the die member, a metallic, heat conducting member leading vertically away from the die member and having a diameter substantially as great as the entire die face, and means for insulating the marginal portions of said die member against heat loss.

14. In glass disk pressing machinery, a metal die member, a metallic, heat-conducting member leading vertically away from the die-face and of substantially the same diameter as said die-face, means interposed between said die face and conducting member for distributing laterally across said die member any localized heating on said die face, means for restricting the loss of heat laterally from said die member and means for dissipating heat from a portion of said conducting member which is so far removed from said die-face as to have a uniform effect on all parts thereof.

15. In glass disk pressing machinery, a metal die member having a substantially flat die face on one side and a central projection on the other side, a mass of heat conductive material which said projection engages, and a support for said die member having a circular wall which engages the rim of said die member and defines an annular chamber about said projection.

16. In glass disk pressing machinery, a metal die having an upper working face and a metal part depending beneath that portion to which the hot glass is applied, there being a recess surrounding said depending part and extending parallel to said working face, and a mass of metal in said recess and surrounding said depending part which has a higher rate of heat transference than the metal of said die-face.

17. In glass disk pressing devices, a die member having a metal face formed to make contact with the molten glass, and a shield of heat insulating material embracing such parts of said member, other than the face thereof as shall cause the temperature of such face to become equalized throughout at the working temperature employed.

18. In glass disk pressing devices, a metal die member having a metal face formed to make contact with the molten glass, and a layer of metal of higher heat distributing ability than the metal of the die face located parallel to such die face in stationary heat-conducting relation therewith, and a layer of heat insulating material engaging said member on the opposite side of said metal layer from the working face.

In testimony whereof I hereunto affix my signature.

WILLIAM H. WOOD.